United States Patent
Kataoka

(10) Patent No.: US 8,498,187 B2
(45) Date of Patent: Jul. 30, 2013

(54) OPTICAL DISC APPARATUS AND OPTICAL DISC DISCRIMINATING METHOD

(75) Inventor: Takeyoshi Kataoka, Kawasaki (JP)

(73) Assignees: Hitachi-LG Data Storage, Inc., Tokyo (JP); Hitachi Consumer Electronics Co., Ltd., Tokyo (JP)

(*) Notice: Subject to any disclaimer, the term of this patent is extended or adjusted under 35 U.S.C. 154(b) by 0 days.

(21) Appl. No.: 13/116,086

(22) Filed: May 26, 2011

(65) Prior Publication Data
US 2011/0292776 A1 Dec. 1, 2011

(30) Foreign Application Priority Data

May 31, 2010 (JP) ................................ 2010-123725

(51) Int. Cl.
*G11B 7/00* (2006.01)

(52) U.S. Cl.
USPC .......................... 369/53.2; 369/94; 369/44.23

(58) Field of Classification Search
USPC .............. 369/44.25, 44.27, 44.29, 44.32, 94, 369/53.2, 53.23, 53.31, 53.25, 112.02, 112.23, 369/112.24, 44.23
See application file for complete search history.

(56) References Cited

U.S. PATENT DOCUMENTS

| | | | |
|---|---|---|---|
| 2004/0190417 A1 | 9/2004 | Kataoka et al. | |
| 2006/0221782 A1* | 10/2006 | Kanenaga | 369/44.23 |
| 2006/0239139 A1 | 10/2006 | Kataoka et al. | |
| 2006/0280082 A1* | 12/2006 | Yasukawa | 369/53.2 |
| 2007/0070850 A1 | 3/2007 | Watanabe et al. | |
| 2008/0298193 A1* | 12/2008 | Matsuda | 369/53.28 |
| 2008/0298215 A1 | 12/2008 | Setono | |
| 2009/0116346 A1 | 5/2009 | Takahashi | |
| 2009/0154324 A1* | 6/2009 | Sato et al. | 369/112.23 |
| 2009/0245072 A1* | 10/2009 | Asano et al. | 369/112.23 |
| 2011/0242948 A1* | 10/2011 | Suzuki et al. | 369/44.26 |

FOREIGN PATENT DOCUMENTS

| | | |
|---|---|---|
| JP | 2004-311004 | 11/2004 |
| JP | 2006-309809 | 11/2006 |
| JP | 2006-344268 | 12/2006 |
| JP | 2007-122880 | 5/2007 |
| JP | 2008/293611 | 12/2008 |

OTHER PUBLICATIONS

Search Report issued in European Patent Application No. 11167983.3 on Sep. 7, 2011.

* cited by examiner

*Primary Examiner* — Thang Tran
(74) *Attorney, Agent, or Firm* — Antonelli, Terry, Stout & Kraus, LLP.

(57) ABSTRACT

In an optical disk having multiple layers for which a correction of spherical aberration is required, a spherical aberration correcting element is set to a predetermined spherical aberration correction amount; a laser light source is turned ON; an objective lens is swept; when it is discriminated that the optical disk has two or more layers, or has more than two information recording planes, the spherical aberration correction amount is changed into a spherical aberration correction amount suitable for information recording planes of three, or more layers; and the objective lens is again swept so as to discriminate a total layer number thereof.

12 Claims, 16 Drawing Sheets

OPTICAL DISC APPARATUS AND OPTICAL DISC DISCRIMINATING METHOD

INCORPORATION BY REFERENCE

This application relates to and claims priority from Japanese Patent Application No. 2010-123725 filed on May 31, 2010, the entire disclosure of which is incorporated herein by reference.

BACKGROUND OF THE INVENTION

The present invention is related to a method for discriminating optical disks from each other in an optical disk apparatus.

In optical disks, there are various sorts of media such as BDs (Blu-ray disks), DVDs, and CDs. While there are a large number of optical disk apparatus adaptable to a plurality of media, these optical disk apparatus are required to discriminate the sorts of inserted optical disks from each other. In BDs, influences caused by spherical aberration are large, and it is difficult to discriminate BDs from each other unless spherical aberration is corrected to a predetermined level by a spherical aberration correcting element. JP-A-2004-311004 discloses a method for performing the discrimination of media from a medium whose numerical aperture is low in order to prevent collision, and describes that spherical aberration is corrected in combination with the numerical aperture at this time. JP-A-2006-344268 discloses a method for discriminating the total layer number of information recording planes of a medium by performing a sweep process in which an objective lens is driven two or more times by changing a correction amount of spherical aberration.

SUMMARY OF THE INVENTION

When the BDs are discriminated from each other, discrimination can be hardly performed unless the spherical aberration is corrected to a certain degree. Also, when optical recording media are discriminated from each other, not only the sort of an optical disk is required to be discriminated, but also the total number of information recording planes of this optical disk is required to be discriminated. In this case, when an optical disk having two layers is employed, for instance, the two-layer optical disk can be discriminated including the total layer number thereof based upon a spherical aberration correction amount corresponding to an intermediate layer of two layers. However, with respect to an optical disk having layers larger than two layers, if this optical disk is discriminated based upon only the spherical aberration correction amount corresponding to the intermediate layer of the two layers, then precision thereof is deteriorated. Also, in the case that a sweep process is carried out a plurality of times by changing the state of the spherical aberration correction, although precision for discriminating the total layer number is increased, there is a problem that time required for the discrimination is prolonged, and the efficiency is deteriorated.

When optical disks are a one-layer disk and a two-layer disk, the spherical aberration correcting element is firstly set to such a spherical aberration correction amount capable of discriminating between the one-layer disk and the two-layer disk at a high probability; laser light is turned ON under this situation; and an objective lens is swept so as to discriminate these one-layer and two-layer disks from each other. When it is discriminated that an optical disk has two or more layers, or the optical disk has more than two information recording planes, the above-described spherical aberration correction amount is changed into such a spherical aberration correction amount adaptable for information recording planes of three or more layers; and the objective lens is swept so as to discriminate the total layer number thereof.

In accordance with the present invention, even when the total number of information recording planes of the optical disk is increased which requires a correction of spherical aberration, the total layer number thereof can be discriminated in high precision and a high efficiency.

Other objects, features and advantages of the invention will become apparent from the following description of the embodiments of the invention taken in conjunction with the accompanying drawings.

BRIEF DESCRIPTION OF THE DRAWINGS

These and other features, objects and advantages of the present invention will become more apparent from the following description when taken in conjunction with the accompanying drawings.

DETAILED DESCRIPTION OF THE INVENTION

Figure 1:
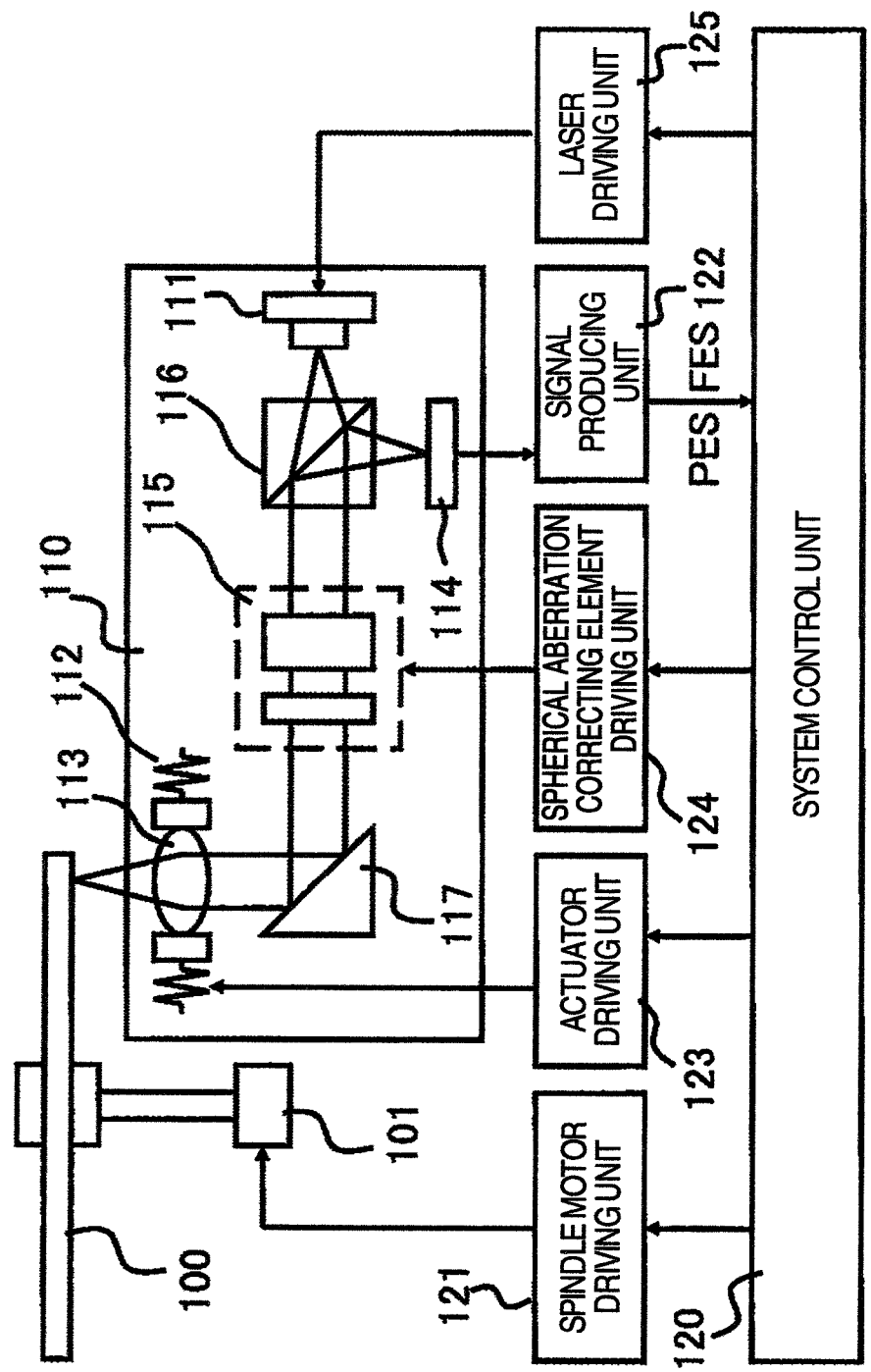
FIG. 1 is a block diagram for representing a configuration of an optical disk apparatus of the present invention.

Referring now to the drawings, a description of specific embodiments will be described.

Embodiment 1

FIG. 1 is a block diagram for representing a configuration of an optical disk apparatus according to the present embodiment. While information is read, erased, and written with respect to an optical disk 100 by irradiating thereon laser light from an optical pickup 110, the optical disk 100 is rotated by a spindle motor 101 driven by a spindle motor driving unit 121 which receives a spindle motor driving signal from a system control unit 120. The laser light emitted from a laser light source 111 passes through a polarization beam splitter 116, and enters an objective lens 113 via a spherical aberration correcting element 115 and a mirror 117, and then, is collected as an optical spot on an information recording plane of the optical disk 100.

Laser light reflected by the information recording plane of the optical disk 100 is reflected by the polarization beam splitter 116 via the objective lens 113, the mirror 117, and the spherical aberration correcting element 115, and then enters a photodetector 114. The laser light is collected as an optical spot on the information recording plane of the optical disk 100 by the objective lens 113 moved by an actuator 112, reflected by the information recording plane of the optical disk 100, and the reflected laser light is detected by the photodetector 114. From signals detected by the photodetector 114, a focusing error signal (FES), a tracking error signal, a position error signal (PES), and the like are produced by a signal producing unit 122. The FES is a focusing error signal which is produced by the astigmatism method, the knife-edge method, and the like, which are known in this field, and the PES is a signal produced by filtering a summed signal of reflection light through a low-pass filter to suppress a high frequency component thereof.

In order to correct spherical aberration occurred on the information recording plane of the optical disk 100, spherical aberration is given to the laser light by the spherical aberration correcting element 115. The spherical aberration correcting element 115 is a beam expander constructed by combining two pieces of lenses, the lens-to-lens distance of which is variable, while the beam expander can adjust the spherical aberration of a penetrated light flux by changing this lens-to-lens distance. It should be understood that the spherical aberration correcting element 115 employed in the present invention is not limited only to the above-described beam expander. Alternatively, it is possible to employ, for instance, a liquid crystal element having a coaxial pattern and capable of correcting the spherical aberration by providing a phase difference between the inner circumferential portion and the outer circumferential portion of a light flux. Further, although not shown, an element for correcting aberration other than the spherical aberration, and an element for polarizing may be alternatively mounted in the optical pickup 110.

Among signals inputted to the system control unit 120, a focusing error signal is read out as a signal indicative of an error amount between the optical spot and the information recording plane, and a tracking error signal is read out as a signal indicative of an error amount in a radial direction between the optical spot and a track formed by pits or grooves which are continued in a spiral shape on the information recording plane of the optical disk 100. The actuator 112 is driven by an actuator driving unit 123 which receives a focusing drive signal for moving the actuator 112 along a focusing direction, and a tracking drive signal for moving the actuator 112 along the radial direction so as to move the objective lens 113 along the focusing direction and the radial direction of the optical disk 100. Alternatively, the actuator 112 may also be moved along a tilt direction in order to correct a coma aberration. The spherical aberration correcting element 115 is driven by spherical-aberration correction element driving unit 124 which receives a signal outputted from the system control unit 120. The laser light source 111 is controlled by a laser driving unit 125 which receives a signal outputted from the system control unit 120.

Figure 2:
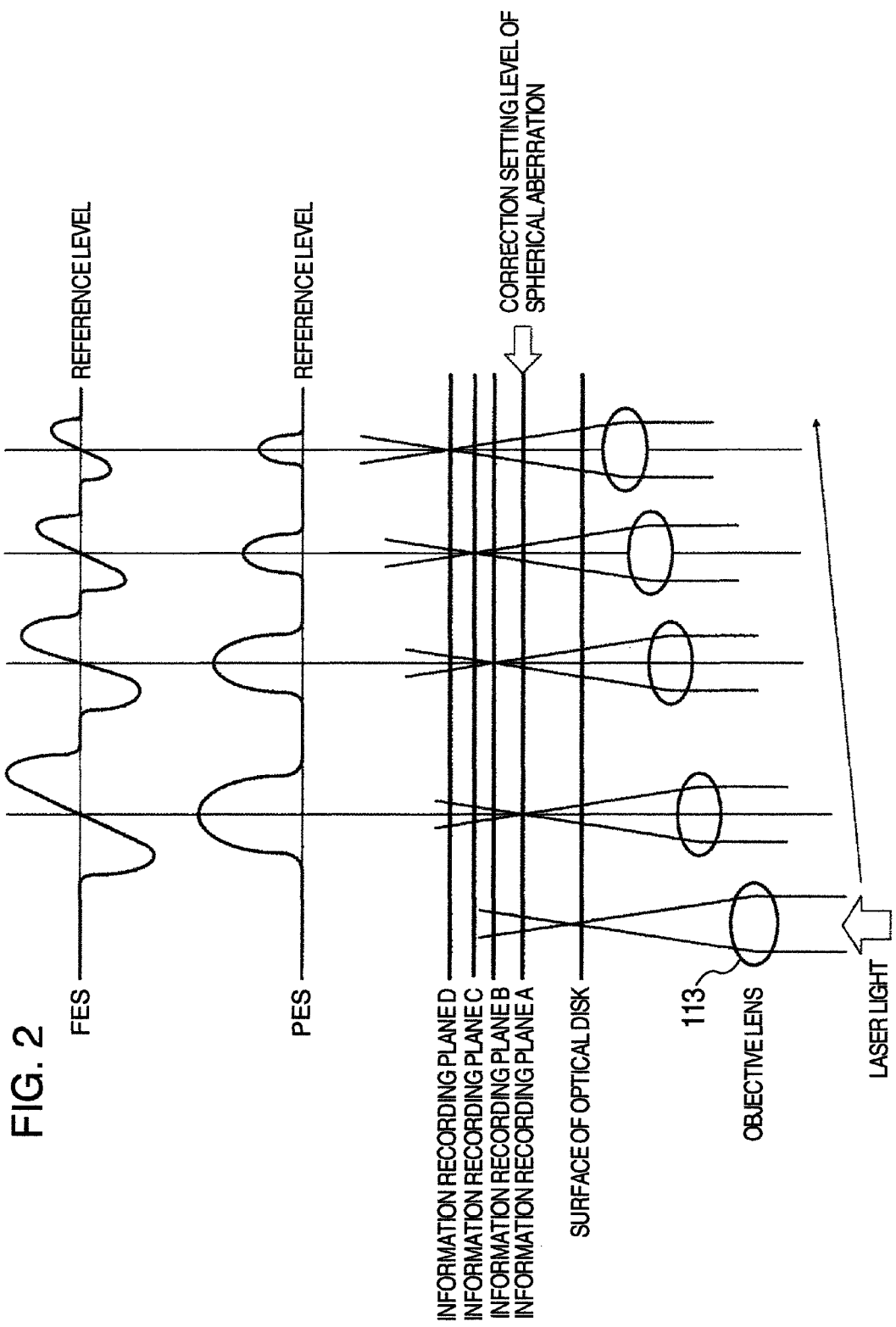
FIG. 2 is a diagram for representing signal waveforms in a sweep process.

FIG. 2 represents situations of signal waveforms of an FES and a PES in such a case that the optical spot sequentially passes through information recording planes of the optical disk 100 from the side close to the surface of the optical disk 100 by sweep processes for moving the objective lens 113 along the focusing direction, namely, by an up-sweep process for moving the objective lens 113 in a direction along which the objective lens 113 approaches the optical disk 100. In the optical disk 100, there are four information recording planes which are defined, from an information recording plane close to the surface, as an information recording plane A, an information recording plane B, an information recording plane C, and an information recording plane D. In this case, it is assumed that the spherical aberration correcting element 115 is set to correct spherical aberration in such a manner that the recording of information becomes optimum on the information recording plane A.

Figure 3:
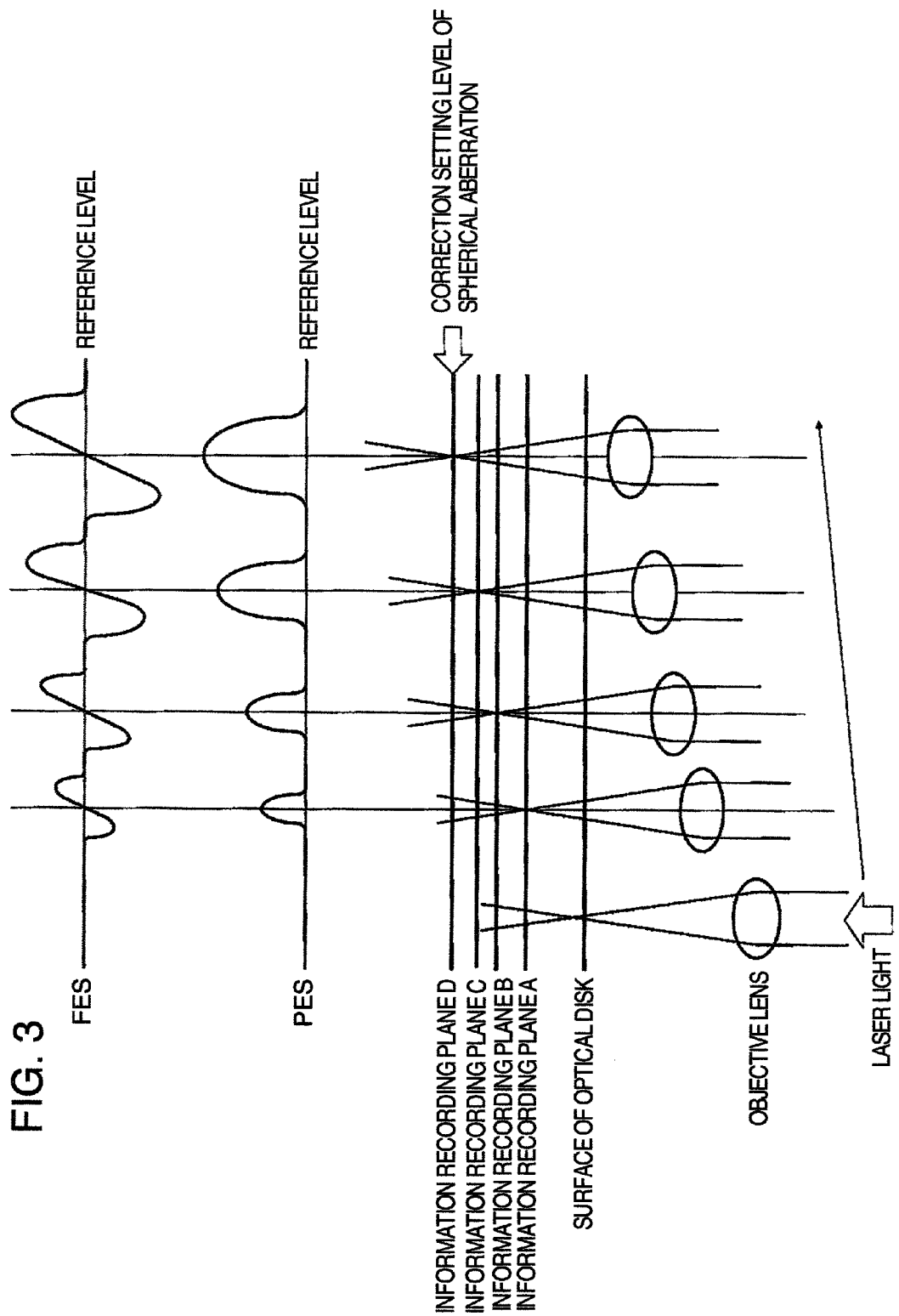
FIG. 3 is a diagram for representing signal waveforms in a sweep process.

As represented in FIG. 2, the further an information recording plane is separated from the information recording plane A, the more signal amplitudes of the FES and the PES are deteriorated due to the influences of the spherical aberration. On the other hand, FIG. 3 is a waveform diagram obtained when a sweep process is carried out in the case that the spherical aberration correcting element 115 is set to correct the spherical aberration in such a manner that the recording of information becomes optimum on the information recording plane D. In this case, different from FIG. 2, the further an information recording plane on the side of the surface is separated from the information recording plane D, the more signal amplitudes of the FES and the PES with respect to reference levels are deteriorated due to the influences of the spherical aberration.

In the case that there are the same types of media as the optical disk 100 of a one-layer medium, a two-layer medium, and a three-layer medium other than the four-layer medium, it is discriminated that which optical disk has been inserted, namely the total layer number of information recording planes is discriminated by detecting amplitudes of the FES and the PES. In this case, if the setting of the spherical aberration correcting element 115 is shifted, then there is a possibility that the total layer number cannot be correctly discriminated. For example, in BDs, the spherical aberration correcting element 115 is necessarily required when recording and reproducing operations are carried out, and the BDs include a one-layer disk and a two-layer disk. In order to discriminate the one-layer disk from the two-layer disk, the BD disks can be discriminated from each other by setting a predetermined correction amount for the spherical aberration correcting element 115. However, when the total layer number is increased to three layers and four layers, if the total layer number is discriminated by the above-described setting level for the spherical aberration correcting element 115, then there is a possibility that the precision is deteriorated.

Figure 4:
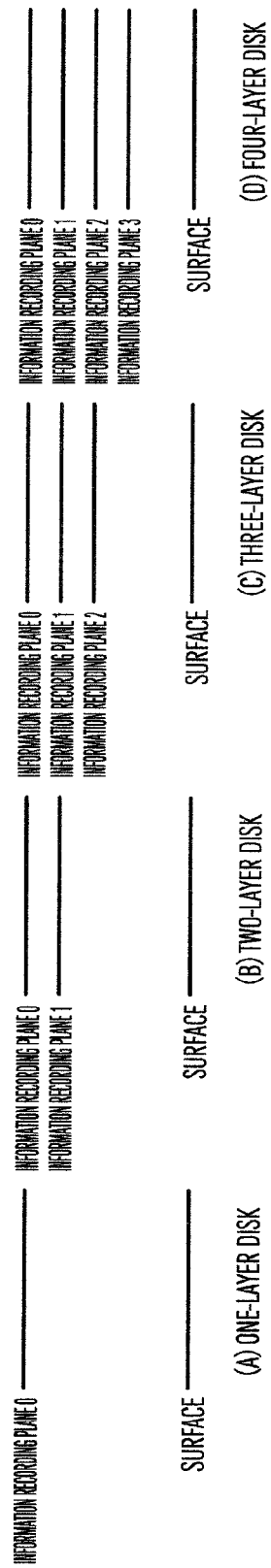
FIG. 4 is a diagram for schematically representing sectional planes of optical disks whose total layer numbers as to information recording planes are different from each other.

FIG. 4 represents four types of optical disks in which the total layer numbers of information recording planes are different from each other, although data are recorded or reproduced by the same laser wavelength. It is assumed that, for all the optical disks represented in FIG. 4, information recording planes located at the furthest distances from the surfaces thereof to which the laser is irradiated are positioned at substantially the same distances from the surfaces Assuming now that the optical disk 100 corresponds to any one of the one-layer disk, the two-layer disk, the three-layer disk, and the four-layer disk, which are represented in FIG. 4, a description is made of a method for discriminating the optical disk 100 as any one of these optical disks by the optical disk apparatus.

Figure 5:
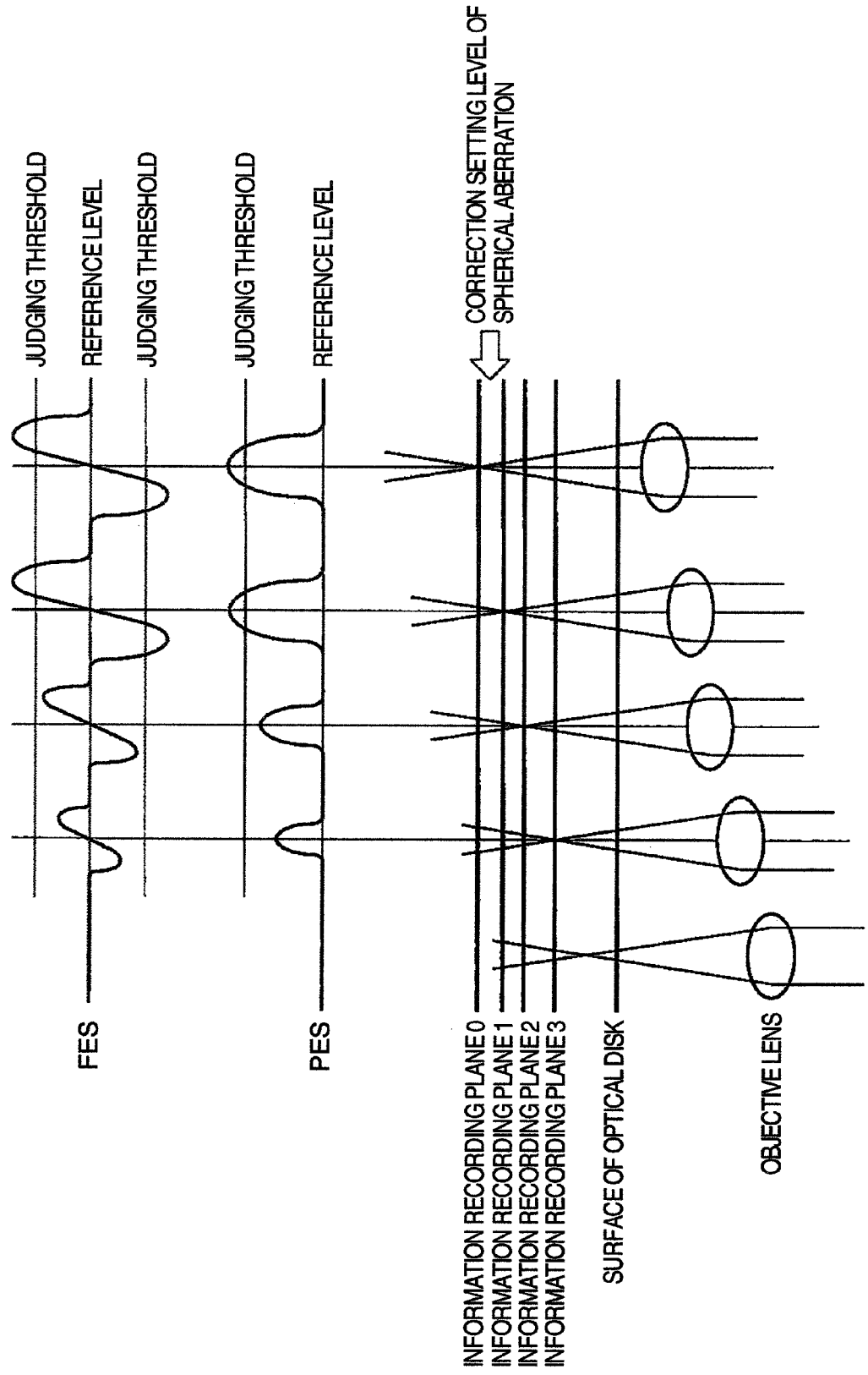
FIG. 5 is a diagram for representing signal waveforms in a sweep process for a four-layer disk.

FIG. 5 represents a waveform diagram when, in such a case where the spherical aberration correcting element 115 is set such that a correction amount of spherical aberration is defined between an information recording plane 0 and an information recording plane 1 of the four-layer disk, the objective lens 113 is swept under the condition that the laser is irradiated onto the four-layer disk. In the present embodiment, it is assumed that a judgement is made that there is a number of information recording planes which is equal to the number when the FES or the PES crosses a predetermined judging threshold. In FIG. 5, since two pieces of the judging thresholds are crossed, it is discriminated that at least two layers are present as to the information recording planes.

Figure 6:
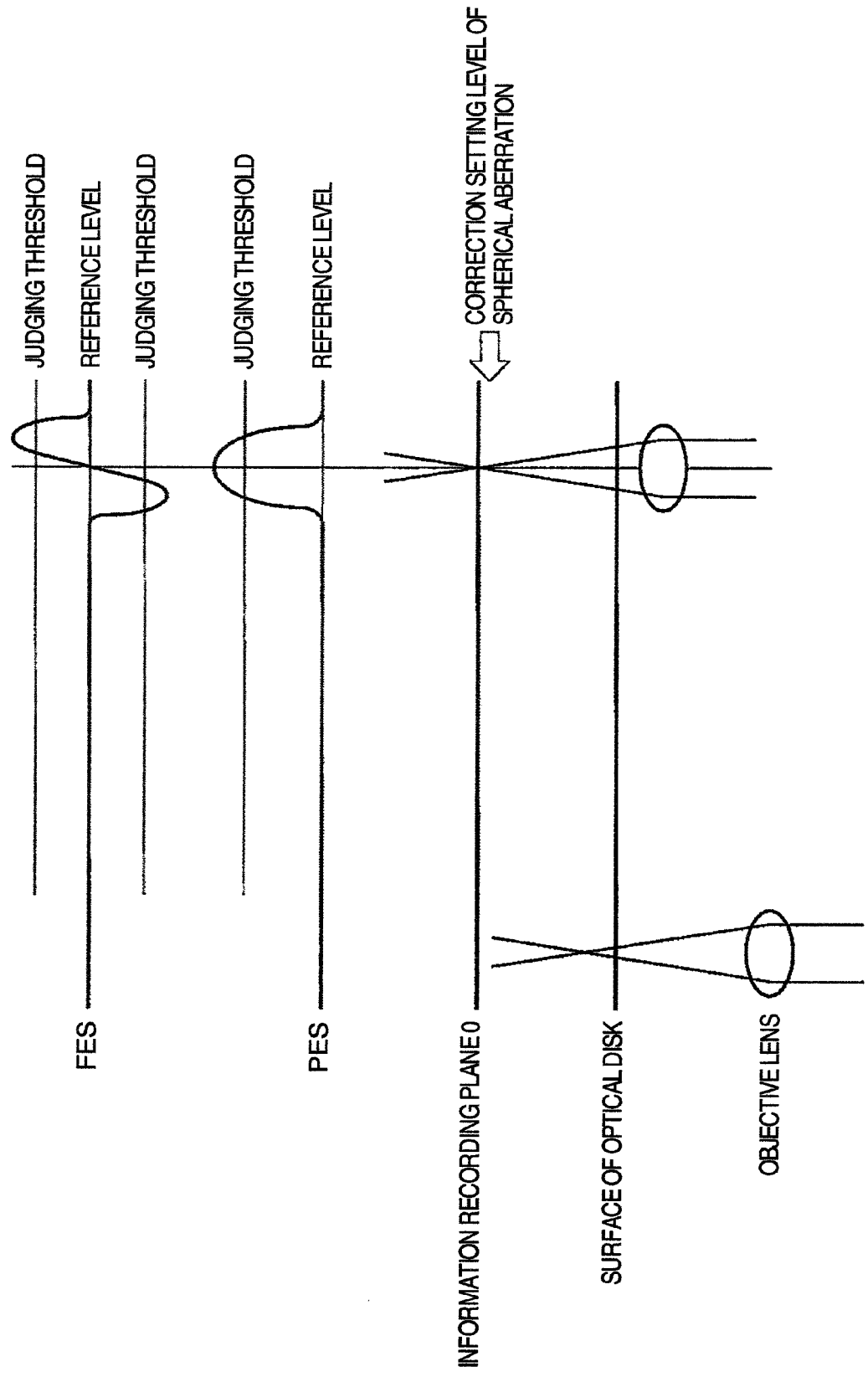
FIG. 6 is a diagram for representing signal waveforms in a sweep process for a one-layer disk.

FIG. 6 represents a waveform diagram obtained when, in such a case where the correction amount of spherical aberration is set equal to that of FIG. 5 and the optical disk 100 is a one-layer disk, the objective lens 113 is swept. In this case, it is detected that only one judging threshold is crossed. As a result, it is discriminated that the optical disk 100 is the one-layer disk having only the information recording plane 0.

Figure 7:
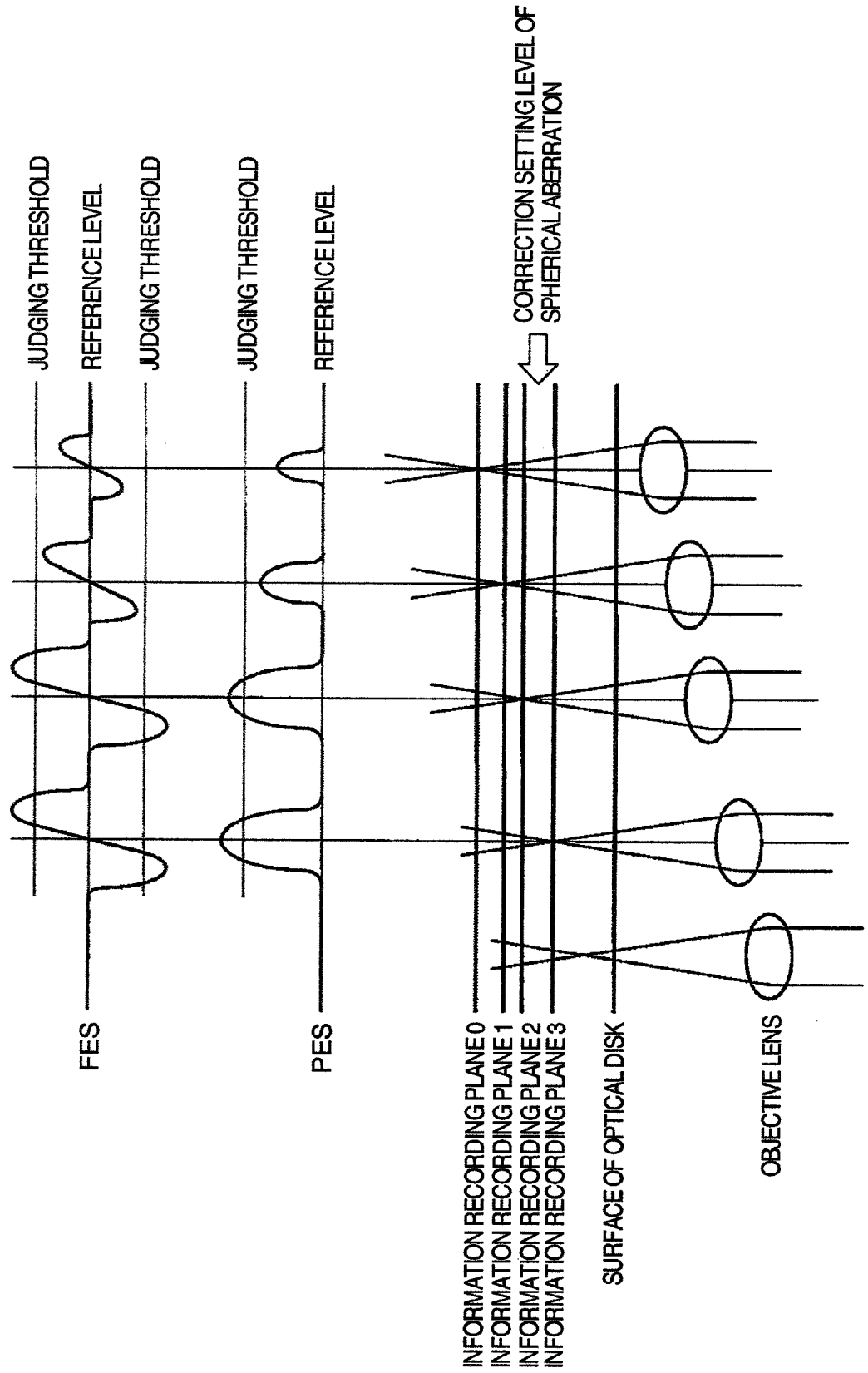
FIG. 7 is a diagram for representing signal waveforms in a sweep process for a four-layer disk.

FIG. 7 represents a waveform diagram obtained when, in such a case where the spherical aberration correcting element 115 is set in such that a correction amount of spherical aberration is defined between an information recording plane 2 and an information recording plane 3 of the four-layer disk, the objective lens 113 is swept under the condition that the laser is irradiated onto the four-layer disk. In this case, the judging thresholds are crossed at two planes of the information recording plane 2 and the information recording plane 3. After it is discriminated in FIG. 5 that there are two layers, the operation of FIG. 7 is performed, so that it is discriminated that the optical disk 100 is a four-layer disk.

Figure 8:
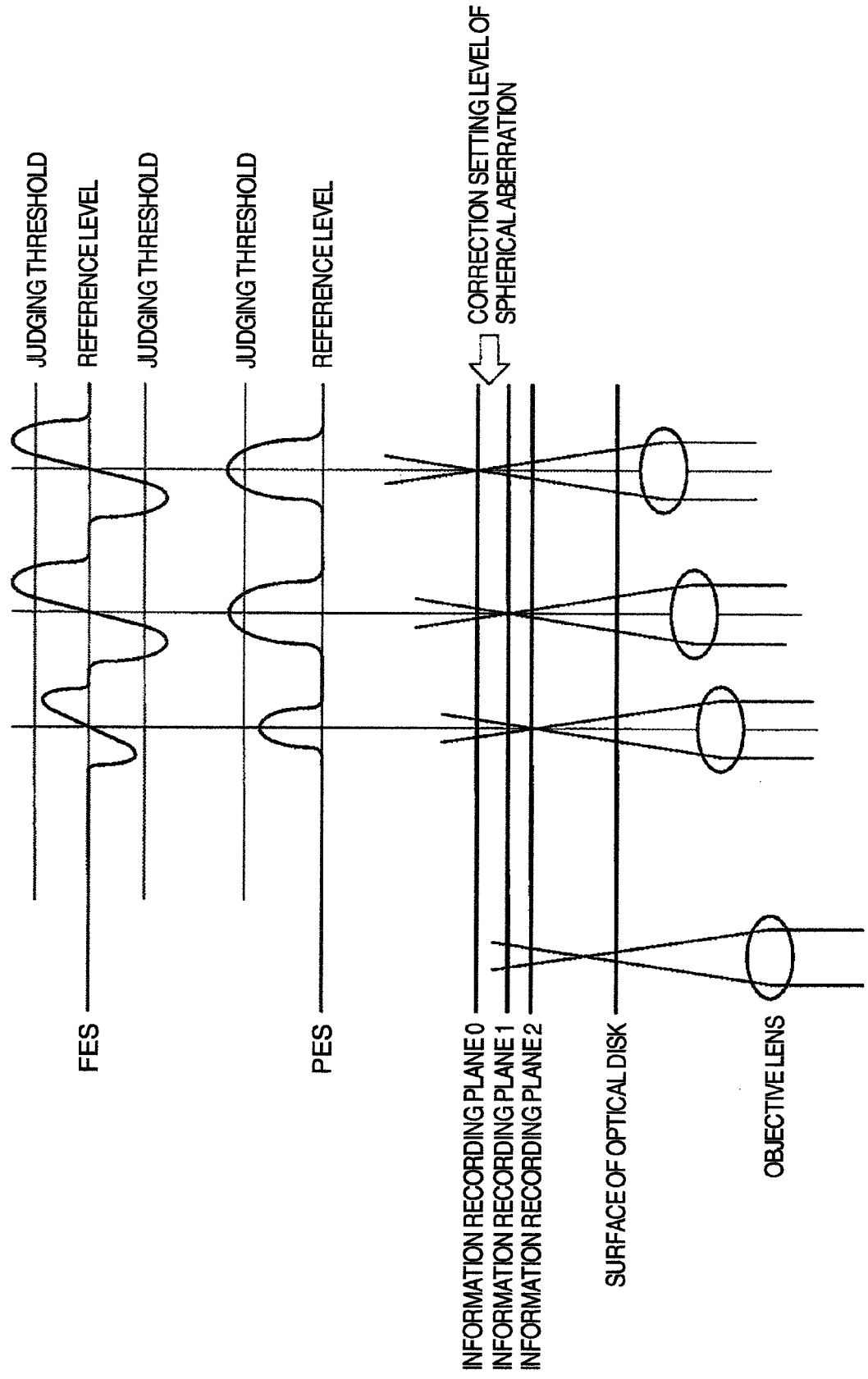
FIG. 8 is a diagram for representing signal waveforms in a sweep process for a three-layer disk.

FIG. 8 represents a waveform diagram obtained when, in such a case where the correction amount of spherical aberration is set equal to that of FIG. 5 and the optical disk 100 is the three-layer disk, the objective lens 113 is swept. In this case, similar to FIG. 5, a detection is made that the judging thresholds are crossed two times. As a result, it is discriminated that at least two layers are present as the information recording planes. Although not shown, thereafter, when the objective lens 113 is swept with the same correction amount of the spherical aberration as that of FIG. 7, only one judging threshold is crossed so that it is discriminated that the optical disk 100 is a three-layer disk.

Also, in such a case that the optical disk 100 is a two-layer disk, when the objective lens 113 is swept under the condition that the correction amount of spherical aberration is set equal to that of FIG. 8, the FES and the PES cross the judging thresholds two times in a similar manner to that of the three-layer disk. Thereafter, when the correction amount of the spherical aberration is set equal to the correction amount of the spherical aberration of FIG. 7, the FES and PES do not cross the judging thresholds, so that it can be discriminated that the optical disk 100 is the two-layer disk.

Figure 9:
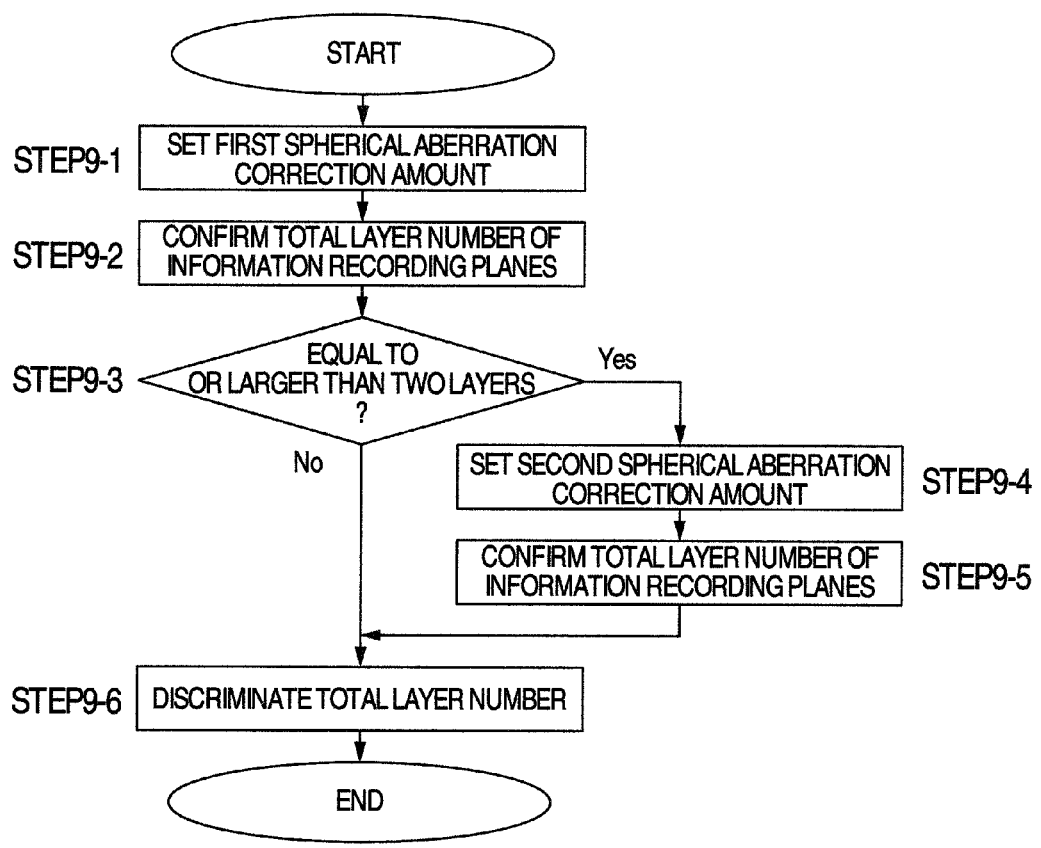
FIG. 9 is a flow chart for representing a total layer number confirming process in Embodiment 1 of the present invention.

In FIG. 9, operation of the present embodiment is represented as a flow chart. Firstly, the spherical aberration correcting element 115 is set to a first correction amount (step 9-1). The objective lens 113 is swept so as to confirm the total layer number of information recording planes (step 9-2). A judgement is made whether or not it is discriminated that the total layer number of the information recording planes is two or more (step 9-3).

When it is discriminated that the total layer number is larger than or equal to two in the step 9-3, the spherical aberration correcting element 115 is set to a second spherical aberration correction amount (step 9-4). The objective lens 113 is swept so as to confirm the total layer number of the information recording planes (step 9-5). It is discriminated that a summation of the total layer number discriminated in the step 9-5 and the total layer number discriminated in the step 9-2 is the total layer number of the optical disk 100 (step 9-6). When it is discriminated to be a one-layer disk in the step 9-3, it is discriminated that the optical disk 100 is the one-layer disk (step 9-6).

According to the method for executing the discriminating process of the present embodiment, in such a case, for instance, where it is discriminated that the information recording planes of an optical disk are two or more layers by performing a first sweep process using a predetermined laser wavelength, since a second sweep process using the above-described predetermined laser wavelength is carried out by changing the correction amount of the spherical aberration correcting element 115, a one-layer disk can be discriminated within a short time by setting the spherical aberration correcting element 115 and performing the sweep process only one time, while for disks containing a plurality of layers a high precision discrimination can be performed. In other words, in accordance with the present embodiment, there is such an advantage that optical disks containing multiple layers can be efficiently discriminated from each other in high precision.

In the present embodiment, the total number of the information recording planes which can be discriminated based upon the first spherical aberration correction amount has been one or two, or larger than two. Alternatively, it is possible to set that three or more pieces of judging thresholds may be crossed based upon the first spherical aberration correction amount, depending upon the standardized values of the layer-to-layer distances of the information recording planes of the optical disk 100, and the characteristics of the optical pickup 110. In this case, it can be discriminated based upon the first spherical aberration correction amount up to a number smaller by one than the maximum layer number at which the FES or the PES crosses the judging thresholds.

Alternatively, the values of the judging thresholds in FIG. 5 to FIG. 8 may be made equal to each other, or may be different from each other by being fitted to the standardized values of the layer-to-layer distances of the information recording planes of the optical disk 100, and the characteristics of the optical pickup 100.

In the present embodiment, as represented in FIG. 4, as to the optical disk 100, the distances of the information recording planes which are separated from the surfaces by the longest distances have been made substantially equal to each other in any optical disks. Alternatively, even when the distances of the furthest information recording planes from the surfaces are different from each other in any of the optical disks, these optical disks may be discriminated by a similar discriminating method.

The present embodiment has described two cases of the first spherical aberration correction amount and the second spherical aberration correction amount. Alternatively, increasing the quantity of the spherical aberration correction amounts may be further increased to, e.g., a third spherical aberration correction amount, in response to the maximum total layer number of an optical disk adaptable for the optical disk apparatus.

Also, while the above-explained discriminating process is assumed as a first simple discriminating process, for instance, in such a case that the optical disk 100 is a BD, and a total recording layer number has been recorded in an area called as a BCA (Burst Cutting Area) laser-cut by either a manufacturer or a producer of the optical disk 100, a PIC (Permanent Information and Control data) area, or a wobble shape of recording tracks, the total recording layer number may be finally defined by reproducing this recorded information.

Embodiment 2

Figure 10:
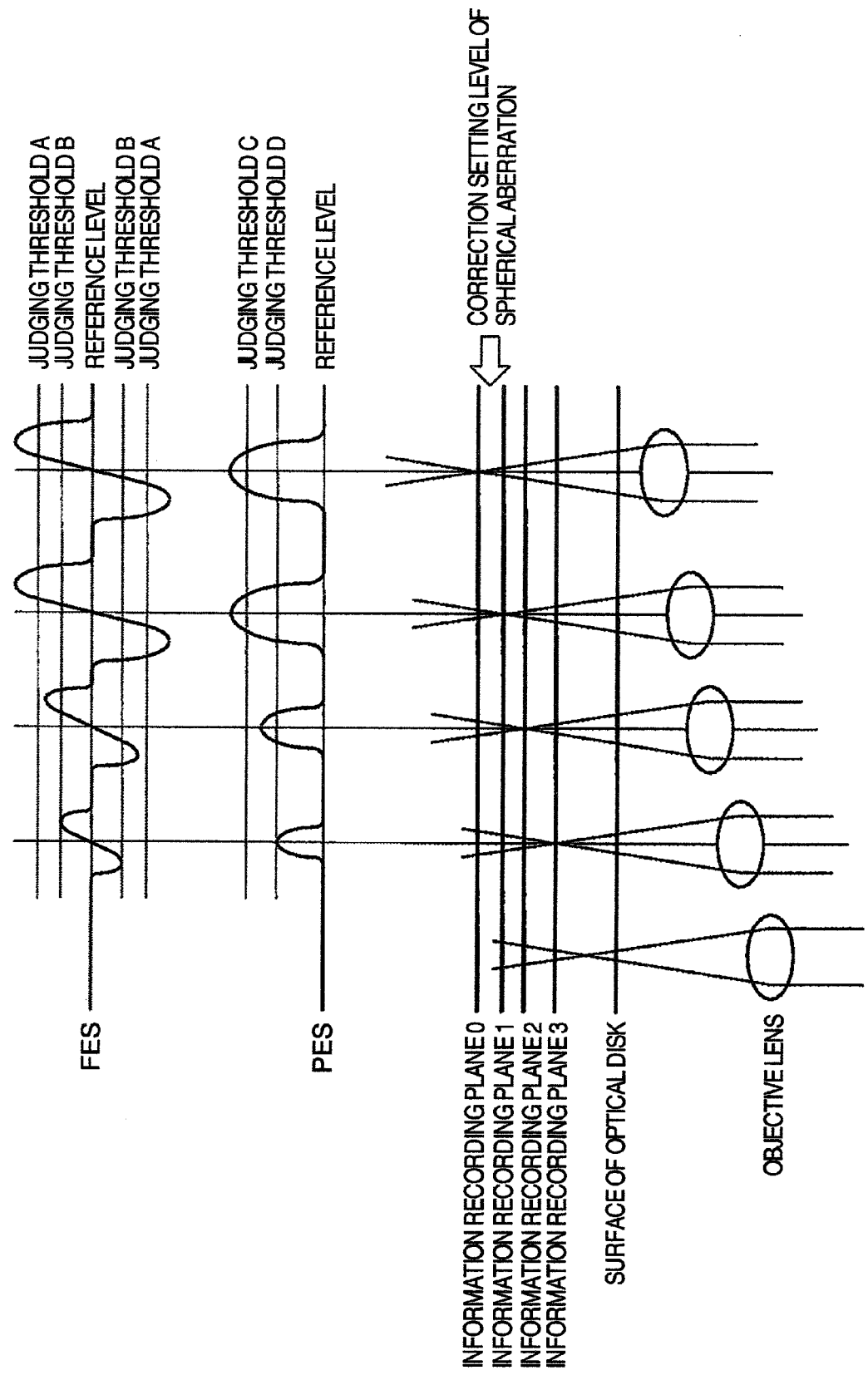
FIG. 10 is a diagram for representing signal waveforms in a sweep process for a four-layer disk.

An optical disk apparatus according to the present embodiment has the same configuration as that of the embodiment 1 represented in FIG. 1. Also, assuming that the optical disk 100 is any one of the one-layer disk, the two-layer disk, the three-layer disk, and the four-layer disk, which can be recorded and reproduced by a predetermined laser wavelength and are represented in FIG. 4, a method by which the optical disk apparatus discriminates the inserted optical disk 100 as any one of the above-described optical disks will be described as follows:

FIG. 10 represents a waveform diagram obtained when, in such a case where the spherical aberration correcting element 115 is set such that a correction amount of spherical aberration is defined between the information recording plane 0 and the information recording plane 1 of the four-layer disk, the objective lens 113 is swept under the condition that the laser is irradiated onto the four-layer disk. In the present embodiment, it is assumed at least that discrimination is made that the optical disk 100 has information recording planes whose total number is equal to a number acquired when the FES crosses a predetermined judging threshold "A" and the PES crosses a predetermined judging threshold "C." In FIG. 10, since the FES crosses two pieces of the judging threshold A and the PES crosses two pieces of the judging threshold C, it is discriminated that at least two layers are present as the information recording planes. In this case, at places other than the places where the judging threshold A and the judging threshold C are crossed, the FES further crosses a predetermined judging threshold "B" and the PES further crosses a predetermined judging threshold "D." In this case, it is discriminated that the optical disk 100 is three or more layers.

Figure 11:
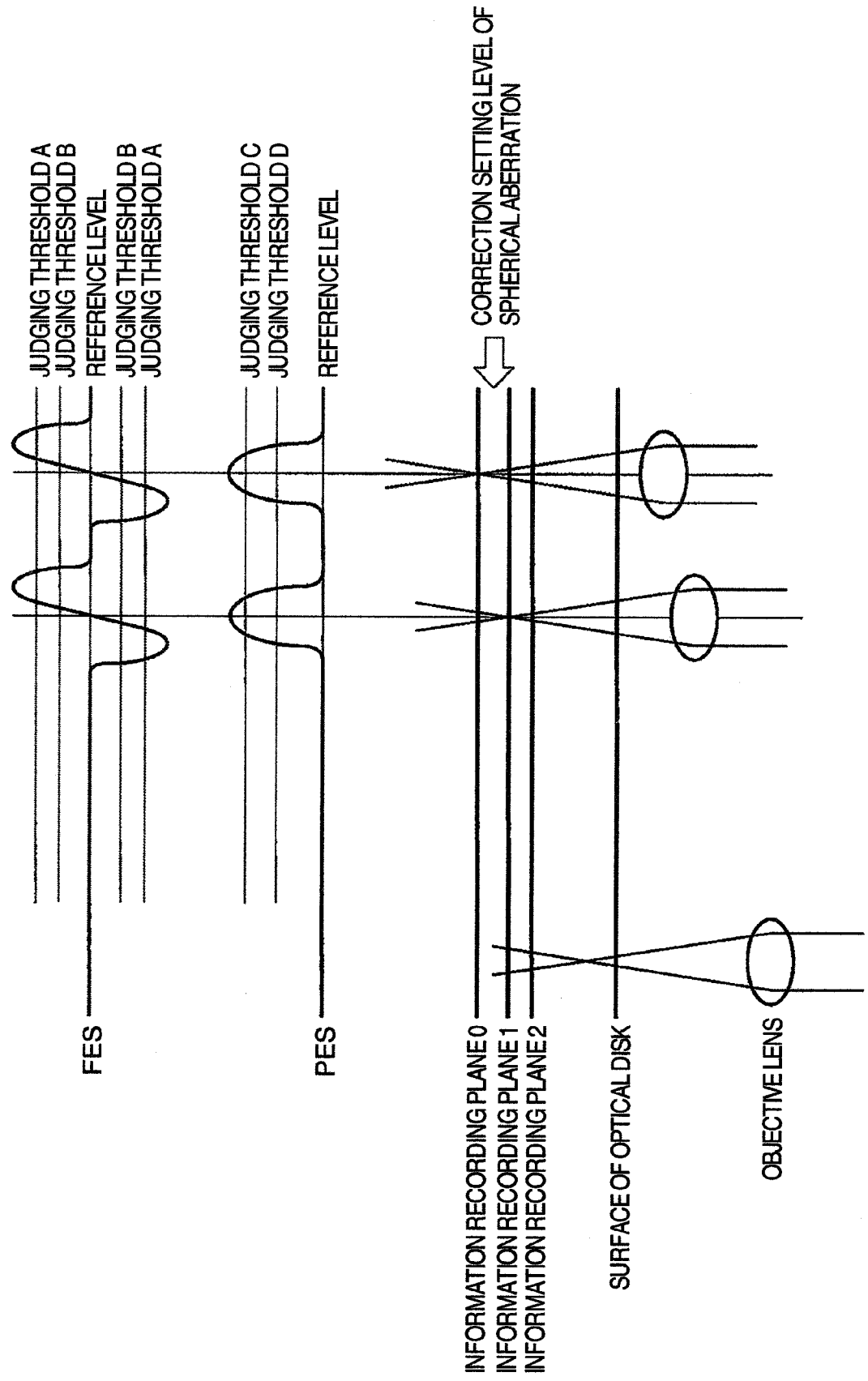
FIG. 11 is a diagram for representing signal waveforms in a sweep process for a two-layer disk.

FIG. 11 represents a waveform diagram obtained when, in such a case where the correction amount of spherical aberration is set equal to that of FIG. 10 and the optical disk 100 is the two-layer disk, the objective lens 113 is swept. In this case, a crossing number is detected such that the FES crosses the predetermined judging threshold A and the PES crosses the predetermined threshold C two times, and thus, it is discriminated that the optical disk 100 has two or more layers. On the other hand, it is not detected that at places other than the places where the judging threshold A and the judging threshold C are crossed, the FES crosses the predetermined judging threshold B and the PES crosses the predetermined judging threshold D. Accordingly, it is discriminated that the optical disk 100 is the two-layer disk.

Figure 12:
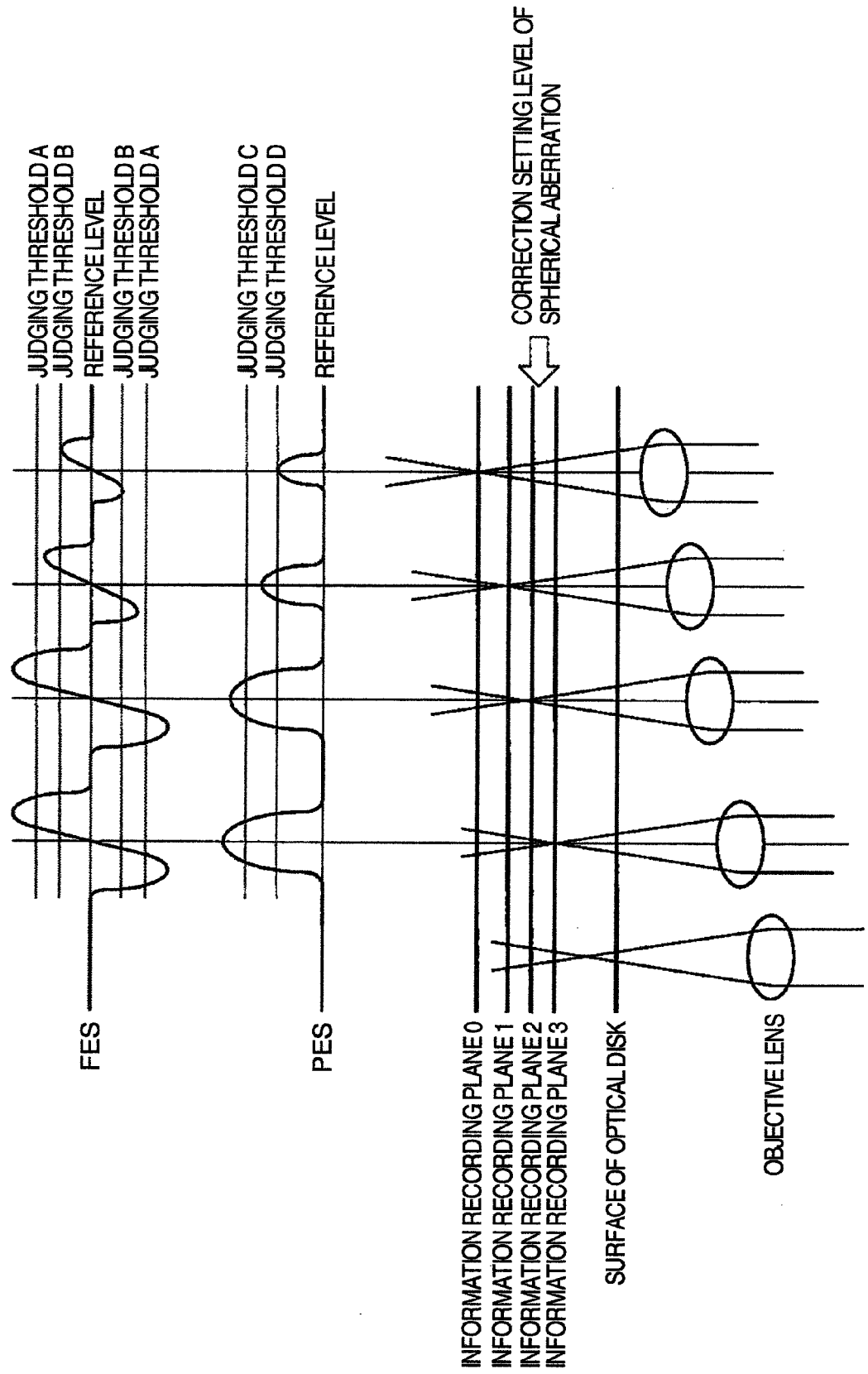
FIG. 12 is a diagram for representing signal waveforms in a sweep process for a four-layer disk.

FIG. 12 represents a waveform diagram obtained when, in such a case where the spherical aberration correcting element 115 is set such that a correction amount of spherical aberration is defined between the information recording plane 2 and the information recording plane 3 of the four-layer disk, the objective lens 113 is swept under the condition that the laser is irradiated onto the four-layer disk. In this case, the FES crosses the predetermined judging threshold A and the PES crosses the predetermined judging threshold C at two planes of the information recording plane 2 and the information recording plane 3. After it is discriminated in FIG. 10 that the information recording planes are three layers or more layers, the operation of FIG. 12 is carried out, and it is discriminated that the optical disk 100 is the four-layer disk.

Figure 13:
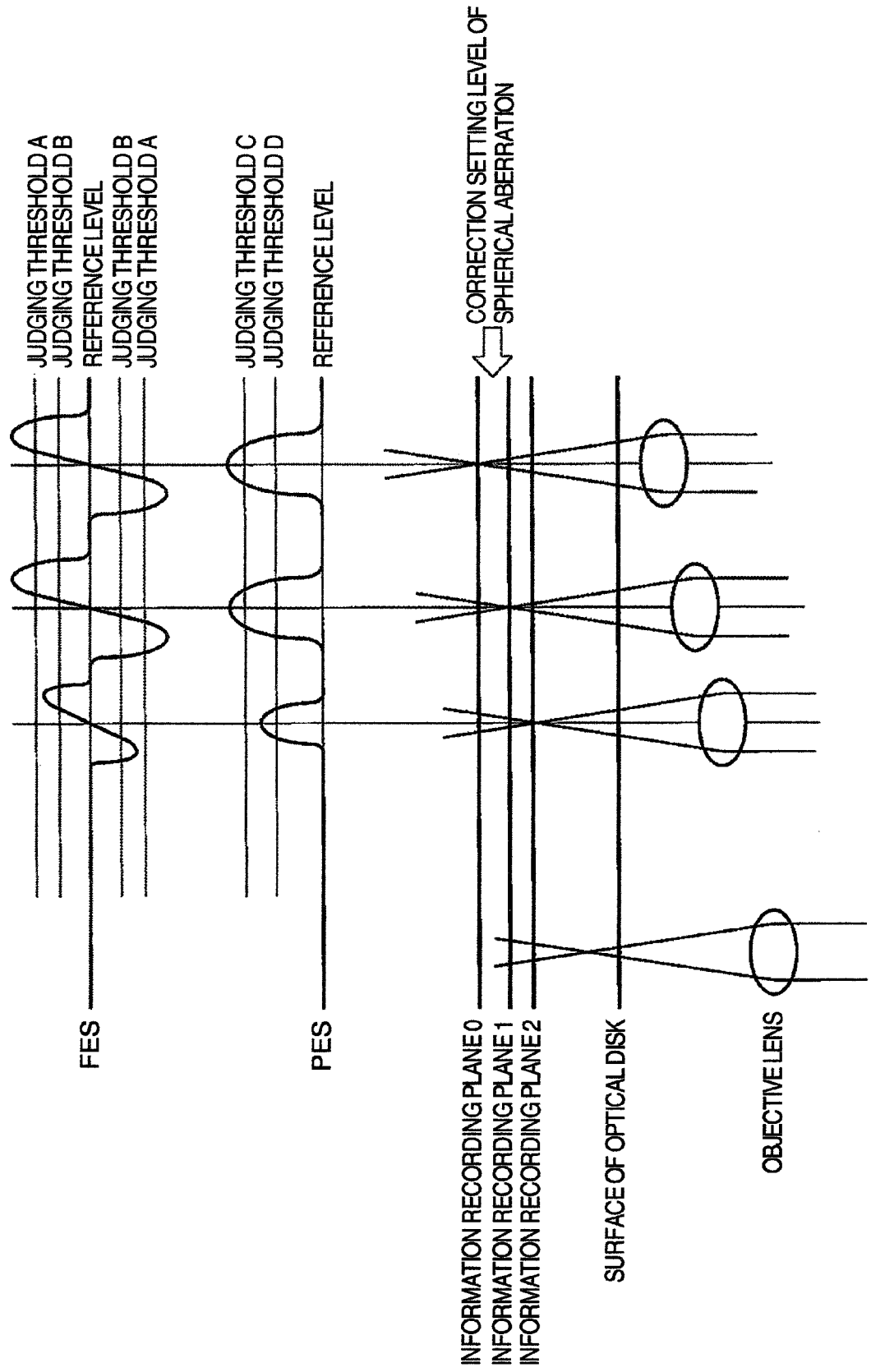
FIG. 13 is a diagram for representing signal waveforms in a sweep process for a three-layer disk.

FIG. 13 represents a waveform diagram obtained when, in such a case where the correction amount of spherical aberration is set equal to that of FIG. 10 and the optical disk 100 is the three-layer disk, the objective lens 113 is swept. In this case, similar to FIG. 10, it is detected that the judging threshold A and the judging threshold C are crossed two times. In addition, it is detected that at places other than the places where the judging threshold A and the judging threshold C are crossed, the FES crosses the predetermined judging threshold B and the PES crosses the predetermined judging threshold D. Accordingly, it is discriminated that the information recording planes are at least three layers or more layers. Although not shown, thereafter, when the objective lens 113 is swept with the same correction amount of the spherical aberration as that of FIG. 12, the judging threshold A and the judging threshold C are crossed only one time, and thus, it is discriminated that the optical disk 100 is the three-layer disk.

Figure 14:
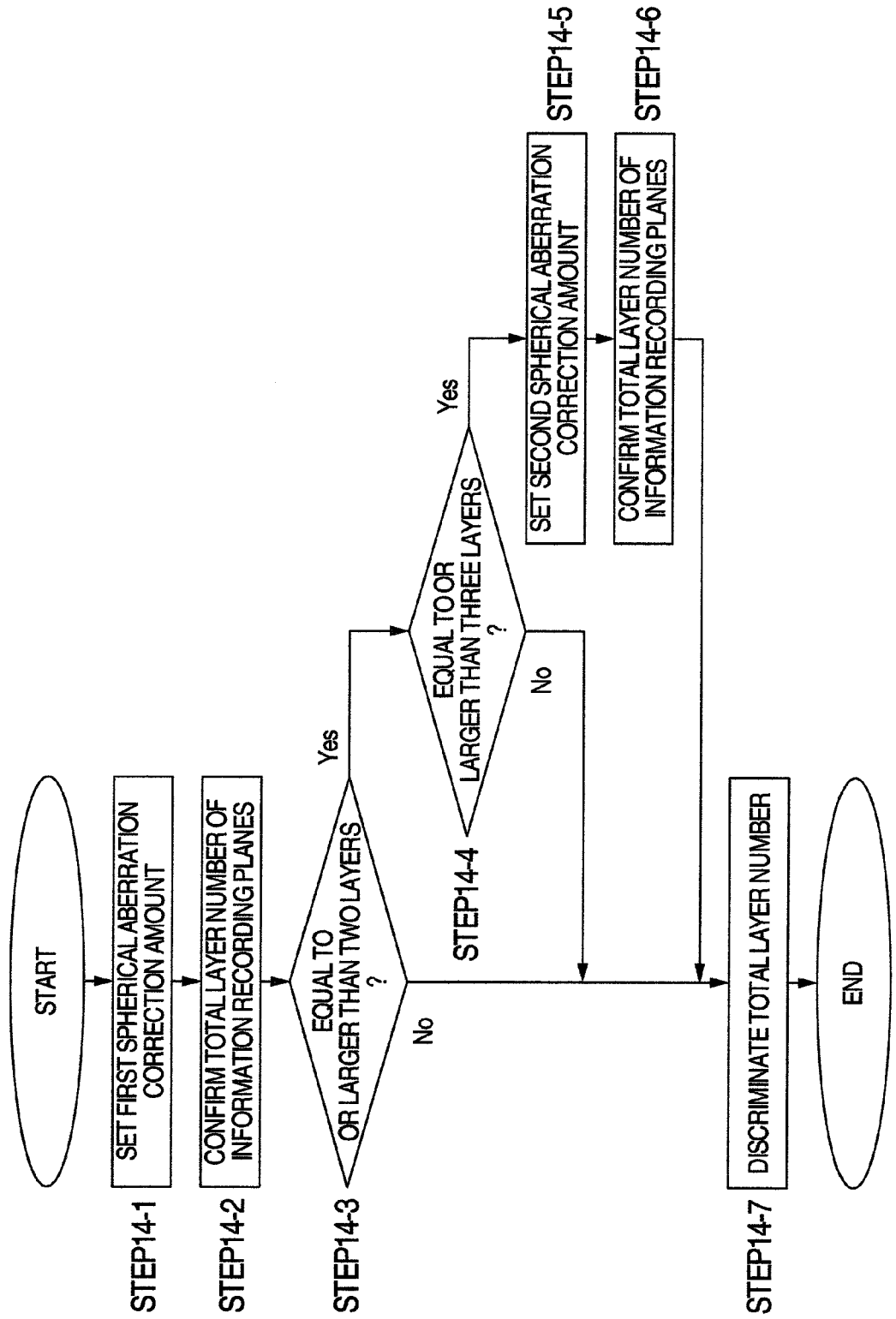
FIG. 14 is a flow chart for representing a total layer number confirming process in Embodiment 2 of the present invention.

In FIG. 14, operation of the present embodiment is represented in a flow chart. Firstly, the spherical aberration correcting element 115 is set to a first correction amount (step 14-1). The objective lens 113 is swept so as to confirm the total layer number of information recording planes (step 14-2). A judgement is made whether or not the total layer number of the information recording planes is two or more based upon the judging threshold A and the judging threshold C (step 14-3). When it is discriminated in the step 14-3 that the total layer number of the information recording planes is two or more, it is discriminated that the total layer number of the information recording planes is three or more (step 14-4).

When it is discriminated that the total layer number is equal to or larger than three in the step 14-4, the spherical aberration correcting element 115 is set to a second spherical aberration correction amount (step 14-5). The objective lens 113 is swept so as to confirm the total layer number of information recording planes based upon the judging threshold A and the judging threshold C (step 14-6). It is discriminated that a summation of the total layer number discriminated in the step 14-3 and the total layer number discriminated in the step 14-6 is the total layer number of the optical disk 100 (step 14-7).

When it is discriminated in the step 14-4 that the total layer number is not equal to or larger than three, it is discriminated that the optical disk 100 is a two-layer disk (step 14-7). In such a case that the total layer number of the information recording plane is discriminated as a one-layer disk in the step 14-3, it is discriminated that the optical disk 100 is the one-layer disk (step 14-7).

According to the present embodiment, in such a case, for instance, where it is discriminated that information recording planes of the optical disk are three or more layers by performing a first sweep process with a predetermined laser wavelength, since a second sweep process using the above-described predetermined laser wavelength is carried out by changing the correction amount of the spherical aberration correcting element 115, the one-layer disk and the two-layer disk can be discriminated only by the first spherical aberration correcting situation. As a result, in such a case that, for example, optical disks having three or more layers are newly standardized in addition to the standardized optical disks having the one-layer and the two-layer such as BDs and DVDs, commercially available optical disks can be quickly discriminated from each other within a short time up to two layers.

The present embodiment has described for the case that the total numbers acquired when the FES and PES cross the predetermined thresholds are defined as the total layer numbers to be discriminated. Alternatively, it is possible to employ another method in which a total number acquired when either the FES or the PES crosses a predetermined threshold is defined as a total layer number of information recording planes.

The respective values of the judging thresholds A, B, C, and D represented in from FIG. 10 to FIG. 13 may be made equal to each other, or may be alternatively different from each other.

Embodiment 3

An optical disk apparatus according to the present embodiment is made by the same configuration as that of the embodiment 1. A description is made of a method for discriminating how many the optical disk 100 has the total layer number of information recording planes. As previously described in the embodiment 1 and the embodiment 2, layers which can be discriminated are different according as the correction amount of the spherical aberration correcting element 115. In the optical disk 100, the recording and reproducing operations are carried out by laser light of the laser light source 111. In this case, if the total layer numbers of the optical disks are different from each other, in many cases the optimum laser power for recording and reproducing operations differs. Also, there are some cases that the optimum laser power is different, depending upon not only the total layer numbers but also the sorts of media as to one-time recordable and plural-time recordable modes. There is a possibility that in optical disks having a plurality of information recording planes, the optimum laser power differs for each of these information recording planes.

It is assumed that the optical disk 100 is such a four-layer optical disk as represented in FIG. 4. The below-mentioned operation is performed: That is, while the spherical aberration correcting element 115 is set to "S" and the laser power is set to "X", a sweep process is carried out so as to detect both an FES signal and a PES signal; subsequently, while the spherical aberration correcting element 115 is set to "T" and the laser power is set to "Y", a sweep process is performed so as to detect both an FES signal and a PES signal. The setting of the spherical aberration correcting element 115 to "S" and the setting of the laser power to "X" imply that amplitudes of the FES signal and the PES signal at least for the information recording plane A and the information recording plane B can be detected. The setting of the spherical aberration correcting element 115 to "T" and the setting of the laser power to "Y" imply that amplitudes of the FES signal and the PES signal at least for the information recording plane C and the information recording plane D can be detected.

Figure 15:
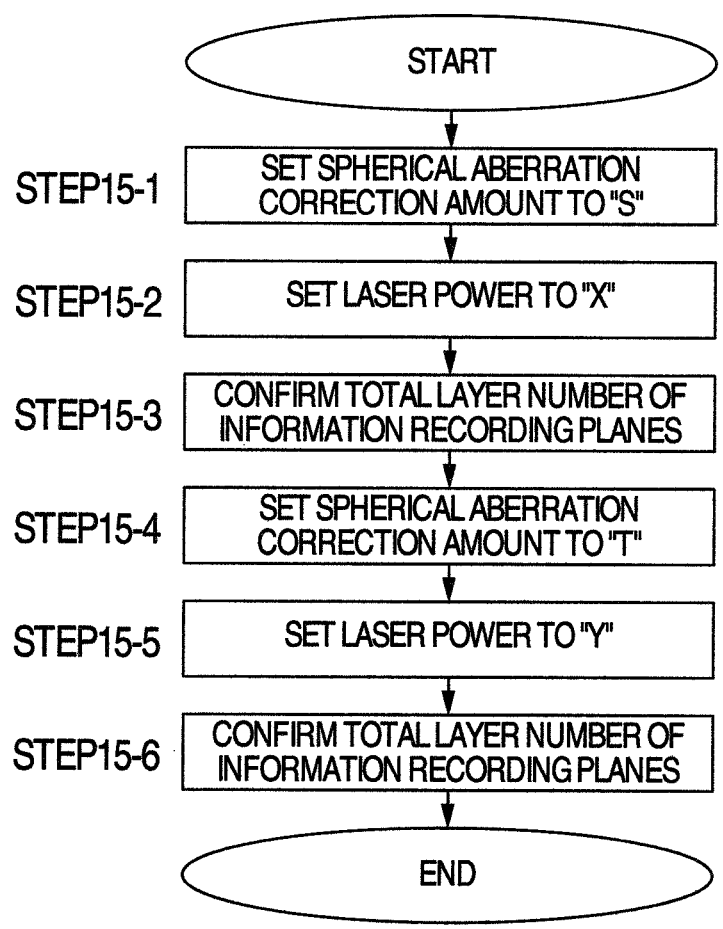
FIG. 15 is a flow chart for representing a total layer number confirming process in Embodiment 3 of the present invention.

FIG. 15 represents the operation of this total layer number confirming process by a flow chart. Firstly, the spherical aberration correcting element 115 is set to the spherical aberration correction amount "S" (step 15-1). Further, the laser power is set to "X" (step 15-2). The objective lens 113 is swept so as to confirm the total layer number of information recording planes (step 15-3). Next, the spherical aberration correcting element 115 is set to the spherical aberration correction amount "T" (step 15-4). The laser power is set to "Y" (step 15-5). The objective lens 113 is swept so as to confirm the total layer number of information recording planes (step 15-6). At this step, the total layer number confirmation for the information recording planes is accomplished. The sweep processes of the steps 15-3 and 15-6 may be realized by either an up sweep for moving the objective lens 113 in the upper direction or a down sweep for moving the objective lens 113 in the lower direction. Further, there is another method that the up sweep is performed in the step 15-3 so as to sweep the objective lens 113 by a predetermined amount; thereafter this state is maintained; the setting of the spherical aberration correcting element 115 and the setting of the laser power are changed in the steps 15-4 and 15-5; and the down sweep is carried out in the step 15-6. Alternatively, in a reversed manner, the down sweep is performed in the step 15-3 so as to sweep the objective lens 113 by a predetermined amount; thereafter this state is maintained; the setting of the spherical aberration correcting element 115 and the setting of the laser power are changed in the steps 15-4 and 15-5; and the up sweep is carried out in the step 15-6. For instance, after the total layer number has been discriminated, in such a case that information is recorded or reproduced on the respective information recording planes, the spherical aberration correction amounts are set to be suitable for the respective information recording planes. Similarly, the laser power is set to be suitable for an information recording plane where focus capturing is executed. At this time, it is also possible to execute an operation in which after the total layer number has been discriminated, the spherical aberration correcting element 115 may be alternatively driven so as to acquire a more suitable spherical aberration correction amount. This alternative operation may also be applied to the laser power. Moreover, although a detailed description will be made in an embodiment 4, for example, the power "Y" of the laser light in the second sweep process is strengthen with respect to the power "X" of the laser light in the first sweep process, thereby an influence to the recording state of an information recording plane can be reduced.

Although the present embodiment has described the discriminating method with the sweep process executed two times, the optical disk apparatus may alternatively increase the total time for performing the setting processes and the sweep processes in response to the maximum total layer number of a corresponding optical disk.

According to the method of the present embodiment, in the case that, for example, an optical disk having information recording planes which are equal to or larger than a predetermined total layer number is discriminated, the sweep process for moving the objective lens 113 in the focusing direction using a predetermined laser wavelength is carried out plural times, while the correction amount of the spherical aberration correction element 115 and the power of the laser light are changed. As a result, light amounts of reflection light from the information recording planes further approach the optimum light amount, and the total layer number of the information recording planes can be discriminated in high precision.

Embodiment 4

An optical disk apparatus according to the present embodiment is made by the same configuration as that of the embodiment 1. A consideration is made of a method for discriminating the total layer number of information recording planes, when the total layer number is two layers or more than two layers as represented in the flow chart of FIG. 9 of the embodiment 1, the correction amount of the spherical aberration correcting element 115 is changed, and the sweep process is carried out two times. As previously explained in the embodiment 3, optical disks have different laser powers suitable for recording/reproducing operations when the total layer numbers of the information recording planes are different. Accordingly, in such a case that the total layer number of the information recording planes is discriminated to be two or more, if the laser power used in the first sweep process is changed in the execution of the second sweep process, then the recording medium can be discriminated in higher precision.

Figure 16:
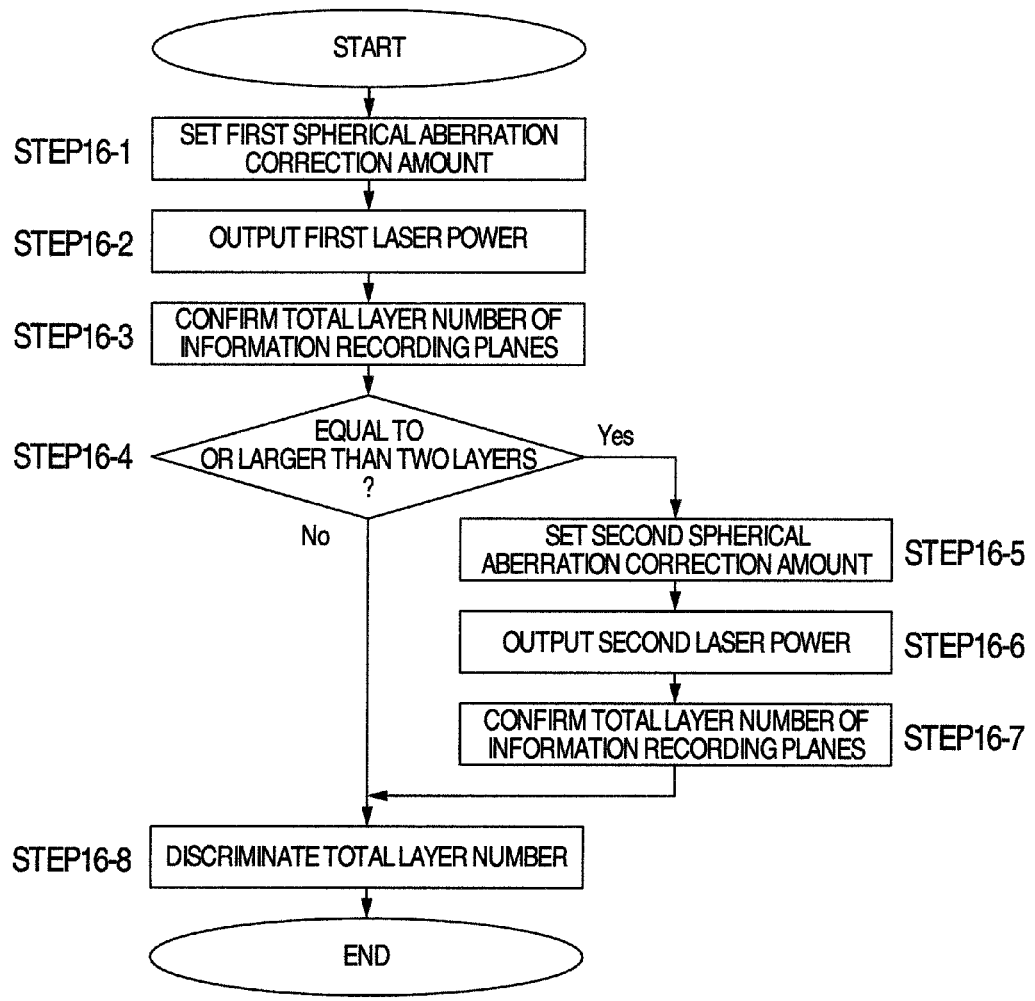
FIG. 16 is a flow chart for representing a total layer number confirming process in Embodiment 4 of the present invention.

FIG. 16 represents the operations of the present embodiment by a flow chart. Firstly, the spherical aberration correcting element 115 is set to a first correction amount (step 16-1).

Since the laser light source 111 is driven by the laser driving unit 125, laser light is outputted with a laser power "P" (step 16-2). The objective lens 113 is swept so as to confirm the total layer number of information recording planes (step 16-3). A judgement is made whether or not the total layer number of the information recording planes is discriminated to be two or more (step 16-4). In the case that the total layer number is discriminated to be two or more in the step 16-4, the spherical aberration correcting element 115 is set to a second spherical aberration correction amount (16-5). Since the laser light source 111 is driven by the laser driving unit 125, laser light is outputted with a laser power "Q" (step 16-6). The objective lens 113 is swept so as to confirm the total layer number of the information recording planes (step 16-7). It is discriminated that a summation of the total layer number discriminated in the step 16-7 and the total layer number discriminated in the step 16-3 is a total layer number of the optical disk 100 (step 16-8). In such a case that the information recording plane is discriminated as a one-layer disk in the step 16-4, it is discriminated that the optical disk 100 is the one-layer disk (step 16-8).

A description is made of the output power of laser light outputted from the laser light source 111 which is driven by the laser driving unit 125. Optimum laser power is different from each other, depending upon the total layer numbers. In this case, it is desirable to perform a discriminating process using a laser power adapted to an optical disk for which the optimum laser power is lowest. As a consequence, in the case of a recordable optical disk, it is possible to avoid that a recording film of an information recording plane reacts during a discriminating process and the recording state is changed. Also, in an optical disk having a plurality of layers, there is a possibility that the optimum laser power is different from each other according as information recording planes. For example, in a four-layer disk, the optimum laser power for the information recording plane 2 may differ from that for the information recording plane 3. In this case, it is desirable to set the laser power to be adapted to an information recording plane for which the optimum laser power is lowest, among the laser powers including those for the information recording planes 2 and 3.

Generally, when the total layer number is increased, there is a tendency that the reflectivities of the information recording planes are lowered. In this case, it is desirable that the laser power "Q" is stronger than the laser power "P." Also, there is a possibility that as to the laser power "Q", the optimum laser powers are different in two layers, three layers, and four layers. In this case, the laser power "Q" is set to adapt to an information recording plane for which the optimum laser power is lowest. In other words, the laser power "P" is adapted to the one-layer disk for which the optimum laser power is lowest, and the laser power "Q" is adapted to an information recording plane for which the optimum laser power is lowest among the two layers, the three layers and the four layers. As a result, not only an improvement in precision can be achieved but also an influence to the recording state of the information recording planes can be reduced. This reason is given as follows: That is, there is a possibility that if laser light with a strong laser power passes through an information recording plane, then the recording state of the passing portion reacts to change. In other words, for instance, since the power of laser light in the second sweep process is set to be stronger than the power of laser light in the first sweep process, the influence to the recording states of the information recording planes can be reduced. This laser power setting may be similarly applied to the configuration of the embodiment 3.

It should be understood that in the case where the spherical aberration correction amount is set between a certain layer and another layer as explained in the present embodiment, a discriminating process may be carried out by slightly strengthening the laser power than the lowest laser power of the information recording plane. This reason may be considered that, namely, a focal point is defocused by a shift of the spherical aberration correction amount, so that the influence to the recording situation is small.

Although the present embodiment has been described as another example for the operation of the flow chart represented in FIG. 9 of the embodiment 1, the present embodiment can allow a similar operation also for the flow chart represented in FIG. 14 of the embodiment 2.

It should also be noted that the present invention is not limited to the above-described embodiments, but may cover various modifications. For example, the above-explained embodiments have been made in order to explain the present invention in detail for easy understanding, but are not limited only to any embodiment equipped with all the described configurations. Alternatively, a portion of the configuration of a certain embodiment may be replaced by a configuration of another embodiment, and further, the configuration of other embodiments may be added to the configuration of the certain embodiment.

Furthermore, while we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

The invention claimed is:

1. An optical disk apparatus for reproducing information from an optical disk, or recording information on the optical disk by using laser light, comprising:
    an objective lens which collects the laser light;
    an actuator which drives the objective lens;
    a detector which detects reflection light from the optical disk;
    a focusing error signal producing means which produces a focusing error signal (FES) from the reflection light detected by the detector;
    a spherical aberration correcting element which corrects spherical aberration occurred in the laser light;
    a control module which produces and outputs a focusing drive signal (FDS) for controlling the actuator and a spherical aberration correcting element drive signal for controlling the spherical aberration correcting element;
    an actuator driving means which amplifies the focusing drive signal (FDS) to supply electric power to the actuator; and
    a spherical aberration correcting element driving means which receives the spherical aberration correcting element drive signal to change a spherical aberration correction amount of the spherical aberration correcting element;
    wherein, in the case that the control module discriminates the optical disk having information recording planes, a total layer number of which is equal to or larger than a predetermined layer number, the control module performs a sweep process for moving the objective lens along a focusing direction a plurality of times while the spherical aberration correction amount of the spherical aberration correcting element is changed, wherein, when the control module discriminates that the information recording planes of the optical disk are two or more layers in a first sweep process, the control module changes the correction amount of the spherical aberration correcting element is changed, and then a second sweep process; and when the control module discriminates that the information recording plane of the optical disk is a one layer in the first sweep process, the control module discriminates the optical disk based upon the first sweep process.

2. An optical disk apparatus for reproducing information from an optical disk, or recording information on the optical disk by using laser light, comprising:

an objective lens which collects the laser light;
an actuator which drives the objective lens;
a detector which detects reflection light from the optical disk;
a focusing error signal producing means which produces a focusing error signal (FES) from the reflection light detected by the detector;
a spherical aberration correcting element which corrects spherical aberration occurred in the laser light;
a control module which produces and outputs a focusing drive signal (FDS) for controlling the actuator and a spherical aberration correcting element drive signal for controlling the spherical aberration correcting element;
an actuator driving means which amplifies the focusing drive signal (FDS) to supply electric power to the actuator; and
a spherical aberration correcting element driving means which receives the spherical aberration correcting element drive signal to change a spherical aberration correction amount of the spherical aberration correcting element;
wherein, in the case that the control module discriminates the optical disk having information recording planes, a total layer number of which is equal to or larger than a predetermined layer number, the control module performs a sweep process for moving the objective lens along a focusing direction a plurality of times while the spherical aberration correction amount of the spherical aberration correcting element is changed,
wherein, when the control module discriminates that the information recording planes of the optical disk are three or more layers in a first sweep process, the control module changes the correction amount of the spherical aberration correcting element, and then carries out a second sweep process using a predetermined laser wavelength; and
when the control module discriminates that the information recording planes of the optical disk are either one layer or two layers in the first sweep process, the control module discriminates the optical disk based upon the first sweep process.

3. An optical disk discriminating method in an optical disk apparatus which reproduces information from an optical disk, or records information on the optical disk by using laser light, the optical disk apparatus comprising:

an objective lens which collects the laser light;
an actuator which drives the objective lens;
a detector which detects reflection light from the optical disk;
a focusing error signal producing means which produces a focusing error signal (FES) from the reflection light detected by the detector;
a spherical aberration correcting element which corrects spherical aberration occurred in the laser light;

a control means which produces and outputs a focusing drive signal for controlling the actuator and a spherical aberration correcting element drive signal for controlling the spherical aberration correcting element;
an actuator driving means which amplifies the focusing drive signal to supply electric power to the actuator; and
a spherical aberration correcting element driving means which receives the spherical aberration correcting element drive signal to change a spherical aberration correction amount of the spherical aberration correcting element;

the method comprising steps of:

discriminating the optical disk provided with information recording planes having the total layer number of the planes equal to or larger than a predetermined layer number, and performing sweep process of moving the objective lens along a focusing direction a plurality of times while changing the spherical aberration correction amount of the spherical aberration correcting element each time by using the control module;
wherein, when the discriminating step discriminates that the information recording planes of the optical disk are two or more layers in a first sweep process, changing the correction amount of the spherical aberration correcting element, and then carrying out a second sweep process by using the control module; and
when the discriminating step discriminates that the information recording plane of the optical disk is a one layer in the first sweep process, discriminating the optical disk based upon the first sweep process by using the control module.

4. An optical disk apparatus for reproducing information from an optical disk, or recording information on the optical disk by using laser light, comprising:

an objective lens which collects the laser light;
an actuator which drives the objective lens;
a detector which detects reflection light from the optical disk;
a focusing error signal producing means which corrects spherical aberration occurred in the laser light;
a control module which produces and outputs a focusing drive signal (FDS) for controlling the actuator and a spherical aberration correcting element drive signal for controlling the spherical aberration correcting element;
an actuator driving means which amplifies the focusing drive signal (FDS) to supply electric power to the actuator; and
a spherical aberration correcting element driving means which receives the spherical aberration correcting element drive signal to change a spherical aberration correction amount of the spherical aberration correcting element;
wherein, in the case that the control module discriminates the optical disk having information recording planes, a total layer number of which is equal to or larger than a predetermined layer number, the control module performs a sweep process for moving the objective lens along a focusing direction a plurality of times while the spherical aberration correction amount of the spherical aberration correcting element is changed,
wherein, when the control module discriminates that the information recording planes of the optical disk are two or more layers in a first sweep process, the control module changes the correction amount of the spherical aberration correcting element, and then carries out a second sweep; process; and wherein, when the control module discriminates that the information recording planes of the optical disk are three or more layers in the first sweep process, the control module changes the correction amount of the spherical aberration correcting element, and then carries out the second sweep process; and when the control module discriminates that the information recording planes of the optical disk are either one layer or two layers in the first sweep process, the control module discriminates the optical disk based upon the first sweep process.

5. The optical disk apparatus as claimed in claim 1, wherein the sweep process is performed a plurality of times, while the correction amount of the spherical aberration correcting element and a power of the laser light are changed.

6. The optical disk apparatus as claimed in claim 2, wherein the sweep process is performed a plurality of times, while the correction amount of the spherical aberration correcting element and a power of the laser light are changed.

7. The optical disk apparatus as claimed in claim 5, wherein the power of the laser light in the second sweep process is stronger than the power of the laser light in the first sweep process.

8. The optical disk apparatus as claimed in claim 6, wherein the power of the laser light in the second sweep process is stronger than the power of the laser light in the first sweep process.

9. The optical disk apparatus as claimed in claim 1, wherein a power of the laser light is set to an information recording plane for which an optimum power of the laser light is lowest among the information recording planes of the optical disk to be discriminated.

10. The optical disk apparatus as claimed in claim 2, wherein a power of the laser light is set to an information recording plane for which an optimum power of the laser light is lowest among the information recording planes of the optical disk to be discriminated.

11. The optical disk discriminating method as claimed in claim 3, wherein the sweep process is performed a plurality of times while the correction amount of the spherical aberration correcting element and a power of the laser light are changed each time.

12. The optical disk discriminating method as claimed in claim 4, wherein the sweep process is performed a plurality of times while the correction amount of the spherical aberration correcting element and a power of the laser light are changed each time.

* * * * *